(12) United States Patent
Welz et al.

(10) Patent No.: US 12,383,944 B2
(45) Date of Patent: Aug. 12, 2025

(54) SYSTEMS AND METHODS TO PREVENT CITRUS GREENING

(71) Applicant: MYLAND COMPANY, INC, Phoenix, AZ (US)

(72) Inventors: Sascha J. Welz, Phoenix, AZ (US); Matthew J. Olson, Phoenix, AZ (US); Andrew D. Ayers, Phoenix, AZ (US); Dane N. Hague, Phoenix, AZ (US)

(73) Assignee: MYLAND COMPANY, INC., Phoenix, AZ (US)

( * ) Notice: Subject to any disclaimer, the term of this patent is extended or adjusted under 35 U.S.C. 154(b) by 194 days.

(21) Appl. No.: 18/112,949

(22) Filed: Feb. 22, 2023

(65) Prior Publication Data
US 2023/0264243 A1    Aug. 24, 2023

Related U.S. Application Data

(60) Provisional application No. 63/312,604, filed on Feb. 22, 2022.

(51) Int. Cl.
*B09C 1/10*  (2006.01)
*A01G 7/06*  (2006.01)
*A01G 17/00* (2006.01)

(52) U.S. Cl.
CPC ............... *B09C 1/105* (2013.01); *A01G 7/06* (2013.01); *A01G 17/005* (2013.01)

(58) Field of Classification Search
CPC ........ A01G 17/00; A01G 17/005; A01G 7/00; A01G 7/06; A01G 33/00; B09C 1/105; B09C 2101/00
See application file for complete search history.

(56) References Cited

U.S. PATENT DOCUMENTS

| | | | |
|---|---|---|---|
| 2018/0213778 A1 | 8/2018 | Larson | |
| 2021/0185956 A1* | 6/2021 | Martin | ................ A01H 3/00 |
| 2021/0392886 A1 | 12/2021 | de Souza Della Coletta et al. | |
| 2022/0386623 A1* | 12/2022 | Zorner | ................ A01N 63/38 |

FOREIGN PATENT DOCUMENTS

| | | | |
|---|---|---|---|
| KR | 10-2015-0007040 A | 1/2015 | |
| WO | WO-2016024282 A1 * | 2/2016 | ............ A01N 25/00 |
| WO | 2019147466 A1 | 8/2019 | |

OTHER PUBLICATIONS

CN_106857141_B (Year: 2020).*
CN_110839456_A (Year: 2020).*
WO_2016030584-A1 (Year: 2016).*
International Search Report and Written Opinion, Int'l App. No. PCT/US2023/013651, dated Jun. 15, 2023, 8 pages.
Asimakis, et al., Algae and Their Metabolites as Potential Bio-Pesticides, Microorganisms, 2022, 33 pages, vol. 10, Article 307, MDPI, Basel, Switzerland.

* cited by examiner

*Primary Examiner* — Joshua D Huson
*Assistant Examiner* — Edgar Reyes
(74) *Attorney, Agent, or Firm* — Greenberg Traurig, LLP

(57) ABSTRACT

Some embodiments of the disclosure are directed to systems and methods to treat citrus greening. In some embodiments, one or more samples are taken from a location where citrus greening occurs or may occur. In some embodiments, native microorganisms are isolated and propagated. In some embodiments, the microorganisms include algae. In some embodiments, propagated native algae is returned to an area affected by citrus greening. In some embodiments, the returned propagated native algae is distributed to a concentration of 10 times or more of the original native algae concentration. In some embodiments, the distributed algae increase natural antibiotics and nutrients in the soil resulting in prevention of citrus greening.

14 Claims, No Drawings

SYSTEMS AND METHODS TO PREVENT CITRUS GREENING

CROSS-REFERENCE TO RELATED APPLICATION

This application claims the benefit of and priority to U.S. Provisional Application No. 63/312,604, filed Feb. 22, 2022, which is hereby incorporated herein by reference in its entirety for all purposes.

BACKGROUND

Citrus greening (*Candidatus Liberibacter asiaticus*), also referred to as Huanglongbing (HLB) is a devastating plant disease for which there is currently no cure. The disease is caused by bacteria spread by the Asian citrus psyllid, and affects a tree's ability to take in nourishment which results in fewer and smaller fruit production. This pandemic causes major losses to the orange juice industry and is spreading rapidly throughout the world.

Conventional pesticides and treatment methods are ineffective and can cause environmental damage. Therefore, there is a need in the art for a method of treating citrus greening using environmentally friendly means.

SUMMARY

In some embodiments, a method for treating citrus greening comprises one or more steps. In some embodiments, a step includes selecting a geological area comprising at least one citrus tree. In some embodiments, a step includes taking one or more soil samples at and/or near one or more sample locations where one or more citrus trees will be treated for citrus greening. In some embodiments, a step includes adding a nutrient mixture to the one or more soil samples that enables one or more native microorganisms in the one or more soil samples to propagate and/or multiply into a native batch. In some embodiments, a step includes distributing at least a portion of the native batch to a distribution location.

In some embodiments, the distribution location includes an area within 100 meters of a furthest root extension of a root system of a citrus tree affected by citrus greening. In some embodiments, the distribution location includes an orange (citrus) grove. In some embodiments, the one or more sample locations include a healthy location where one or more citrus trees are not affected by citrus greening.

In some embodiments, the one or more native microorganisms and/or the native batch includes one or more algae native to the one or more sample locations and/or the distribution location. In some embodiments, the one or more native microorganisms include one or more of: unicellular algal species that are typically green or blue-green; flagellated strains of microalgae that are capable of movement once delivered to the distribution location; and algae with mixotrophic growth capability that use utilize multiple food sources to grow.

In some embodiments, a method step includes performing reactor performance validation. In some embodiments, the reactor performance validation includes testing microorganism candidates for the distributing in identical bioreactors. In some embodiments, a method step includes performing contamination resilience. In some embodiments, contamination resilience includes exposing the one or more native microorganisms to a contamination test. In some embodiments, a method step includes choosing the one or more native microorganisms most resistant to the contamination used in the contamination test. In some embodiments, a method step incudes testing inhibitory or bactericidal effects on *Candidatus Liberibacter* spp.

In some embodiments, the distributing includes adding the native batch to an irrigation system configured to deliver fluid to one or more citrus trees. In some embodiments, distributing at least a portion of the native batch to a distribution location includes supplying 10 times or more an amount of native algae to the distribution location. In some embodiments, distributing at least a portion of the native batch to a distribution location includes supplying a concentration per unit volume of native algae to the distribution location at an average of 10 times or more than the current amount of native algae at the distribution location.

DETAILED DESCRIPTION

In some embodiments, this disclosure is directed to systems and methods (herein after, the "system") for treating citrus greening. As used herein, citrus greening is term interchangeable with *Candidatus Liberibacter*, Huanglongbing, and/or yellow dragon disease, and causes citrus trees to produce citrus fruits that are unsuitable for sale. In some embodiments, system is configured to mitigate the inability of citrus trees to absorb nutrients from the soil by providing an enhanced nutrient rich environment.

In some embodiments, a method step of treating citrus greening comprises selecting a geological area comprising at least one citrus tree. The term "tree" includes all stages of a citrus tree's development from seed to full maturity. In some embodiments, a method step for treating citrus greening comprises taking soil samples at or near a location where one or more citrus trees will be treated by the system. In some embodiments, a method step includes taking one or more soil samples at or near a location where one or more citrus trees are not affected by citrus greening. The term "near" includes an approximately five-mile radius (approximately 8000 meter) from the center and/or edge (i.e., furthest extending citrus tree root) of the treatment area, and the soil, including any microorganism (e.g., algae, fungi) within the soil, within this region is referred to herein as "native."

In some embodiments, a method step includes adding a nutrient mixture to the one or more soil samples comprising one or more vitamins and/or one or more minerals that enable microorganisms in the soil to propagate and/or multiply. In some embodiments, a method step includes adding a nutrient mixture to the one or more soil samples comprising one or more vitamins and/or one or more minerals that enable one or more types of algae in the soil to propagate and/or multiply. In some embodiments, a method step includes isolating the one or more microorganisms. In some embodiments, a method step includes isolating the one or more types of algae. In some embodiments, the isolation is performed using one or more conventional and/or proprietary lab techniques. In some embodiments, a method step includes selecting one or more native species of microorganism for distribution onto the location where one or more citrus trees will be treated by the system. In some embodiments, a method step includes selecting one or more native species of algae for distribution onto the location where one or more citrus trees will be treated by the system.

In some embodiments, the one or more microorganisms include those with one or more of the following characteristics:

- unicellular algal species that are typically green or blue-green;

flagellated strains of microalgae that are capable of movement once delivered to the soil, allowing the algae to spread further throughout the soil;

algae with mixotrophic growth capability that can utilize multiple food sources (e.g., light and sugar) to grow, thereby ensuring that the algae continue to replicate once delivered to the soil.

In some embodiments, a method step includes performing reactor performance validation. In some embodiments, reactor performance validation includes testing the best performing microorganism candidates in identical bioreactors. In some embodiments, the bioreactors are the same type as used in the microorganism distribution systems. In some embodiments, this enables optimal operational performance and shortens the learning curve within the field for the operations team.

In some embodiments, a method step includes performing contamination resilience. In some embodiments, contamination resilience includes exposing the best performing isolated microorganisms to industry standard contamination like bacteria and predatory microorganisms. In some embodiments, contamination resilience includes choosing the microorganism most resistant to standard contamination. In some embodiments, the most resistant microorganism are the ones that survive exposure to standard contamination.

In some embodiments, a method step includes testing inhibitory or bactericidal effects on *Candidatus Liberibacter* spp. (i.e., the bacterium responsible for Huanglongbing).

In some embodiments, a method step includes propagating a selected isolate strain from the one or more soil samples into a culture. In some embodiments, a method step includes propagating a selected isolate strain single cell from the one or more soil samples into a dense culture in a lab. In some embodiments, a method step includes sending a sample of the culture to the geological location. In some embodiments, a method step includes using the culture as an inoculate for a distribution system at the geological location. In some embodiments, the distribution system includes an irrigation system. In some embodiments, a method step includes continuously delivering live, native algae to the location where one or more citrus trees will be treated by the system.

In some embodiments, a single distribution system is configured to deliver live, native algae to between 100 and 1000 acres of farmland, as a non-limiting example. In some embodiments, the geological location and/or farmland comprises an orange grove. In some embodiments, the method includes oversupplying algae to the field (e.g., supplying 10 or more time greater than a native amount of algae). In some embodiments, a method of monitoring effectiveness of oversupplying algae includes comparing a control grove near the application site that is approximately the same age and has tested HLB positive.

In some embodiments, the system and methods described herein use live, native algae to regenerate soil's microbiome by acting as a food source from the other soil microorganisms (e.g., bacteria and fungi) which leads to healthier soil in a HLB positive area. In some embodiments, the additional microorganisms directly provide carbon and free up otherwise unavailable nutrients to be utilized by plants. In some embodiments, the increased carbon and exudates from the microorganisms help with one or more of retaining moisture, controlling erosion, enhancing soil aggregation, reducing sodium and/or salinity, and providing resilience to plant stressors such as Huanglongbing (HLB).

In some embodiments, live, native algae supplied on the farm to soil by the systems and methods described herein produce natural antibiotics and peptides that help resist or kill the bacteria responsible for HLB. In some embodiments, live, native algae supplied to soil affected by HLB helps provide a fertile base to stimulate additional fungal growth to provide soil and environmental benefits such as assisting plants in absorbing water and nutrients among others as well as biodiversity. In some embodiments, the increase in live, native algae cause soil fungi to increase production of peptides that have antibiotic properties.

In some embodiments, oversupplying live, native algae to an orange grove helps provide a fertile base to stimulate mycelial growth and expand the soil mycelial network from plant to plant to provide soil and environmental benefits as well as biodiversity. In some embodiments, supplying live native algae to soil affected by HLB provides a fertile base to stimulate the growth of soil bacteria that in turn produces natural antibiotics and peptides that help resist disease. In some embodiments, the increase in bacteria in soil also increases organic matter content and in turn improve soil health.

In some embodiments, live, native algae supplied on the farm to soil according to the system helps provide a fertile base to stimulate other biologics such as nematodes that are known to produce peptides. In some embodiments, the peptides are identical in structure to plant peptides and are able to promote plant development or help fight plant diseases or bacteria.

In some embodiments, the system includes supplying DNA modified microorganisms (algae) to an area comprising an orange tree affected by HLB to stimulate growth or help fight diseases or other internal and external factors that influence soil and plant health.

The subject matter described herein are directed to technological improvements to the field of treating HLB by introducing an oversupply of algae to the affected site. Moreover, the claims presented herein do not attempt to tie-up a judicial exception with known conventional steps; nor do they attempt to tie-up a judicial exception by simply linking it to a technological field. Indeed, the systems and methods described herein were unknown and/or not present in the public domain at the time of filing, and they provide technologic improvements advantages not known in the prior art. Furthermore, the system includes unconventional steps that confine the claim to a useful application.

It is understood that the system is not limited in its application to the details of construction and the arrangement of components set forth in the previous description or illustrated in the drawings. The system and methods disclosed herein fall within the scope of numerous embodiments. The previous discussion is presented to enable a person skilled in the art to make and use embodiments of the system. Any portion of the structures and/or principles included in some embodiments can be applied to any and/or all embodiments: it is understood that features from some embodiments presented herein are combinable with other features according to some other embodiments. Thus, some embodiments of the system are not intended to be limited to what is illustrated but are to be accorded the widest scope consistent with all principles and features disclosed herein.

Some embodiments of the system are presented with specific values and/or setpoints. These values and setpoints are not intended to be limiting and are merely examples of a higher configuration versus a lower configuration and are intended as an aid for those of ordinary skill to make and use the system.

Furthermore, acting as Applicant's own lexicographer, Applicant imparts the explicit meaning and/or disavow of claim scope to the following terms:

Applicant defines any use of "and/or" such as, for example, "A and/or B," or "at least one of A and/or B" to mean element A alone, element B alone, or elements A and B together. In addition, a recitation of "at least one of A, B, and C," a recitation of "at least one of A, B, or C," or a recitation of "at least one of A, B, or C or any combination thereof" are each defined to mean element A alone, element B alone, element C alone, or any combination of elements A, B and C, such as AB, AC, BC, or ABC, for example.

"Substantially" and "approximately" when used in conjunction with a value encompass a difference of 5% or less of the same unit and/or scale of that being measured.

"Simultaneously" as used herein includes lag and/or latency times associated with a conventional and/or proprietary computer, such as processors and/or networks described herein attempting to process multiple types of data at the same time. "Simultaneously" also includes the time it takes for digital signals to transfer from one physical location to another, be it over a wireless and/or wired network, and/or within processor circuitry.

As used herein, "can" or "may" or derivations there of (e.g., the system display can show X) are used for descriptive purposes only and is understood to be synonymous and/or interchangeable with "configured to" (e.g., the computer is configured to execute instructions X) when defining the metes and bounds of the system.

In addition, the term "configured to" means that the limitations recited in the specification and/or the claims must be arranged in such a way to perform the recited function: "configured to" excludes structures in the art that are "capable of" being modified to perform the recited function but the disclosures associated with the art have no explicit teachings to do so. For example, a recitation of a "container configured to receive a fluid from structure X at an upper portion and deliver fluid from a lower portion to structure Y" is limited to systems where structure X, structure Y, and the container are all disclosed as arranged to perform the recited function. The recitation "configured to" excludes elements that may be "capable of" performing the recited function simply by virtue of their construction but associated disclosures (or lack thereof) provide no teachings to make such a modification to meet the functional limitations between all structures recited.

It is understood that the phraseology and terminology used herein is for description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The previous detailed description is to be read with reference to the FIGURES, in which like elements in different FIGURES have like reference numerals. The FIGURES, which are not necessarily to scale, depict some embodiments and are not intended to limit the scope of embodiments of the system.

Although method operations are presented in a specific order according to some embodiments, the execution of those steps do not necessarily occur in the order listed unless explicitly specified. Also, other housekeeping operations can be performed in between operations, operations can be adjusted so that they occur at slightly different times, and/or operations can be distributed in a system which allows the occurrence of the processing operations at various intervals associated with the processing, as long as the processing of the overlay operations are performed in the desired way and result in the desired system output.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

We claim:

1. A method for treating citrus greening comprising steps of:
    selecting a geological area comprising one or more citrus trees;
    taking one or more soil samples comprising one or more native microorganisms at one or more sample locations;
    adding a nutrient mixture to the one or more soil samples that enables the one or more native microorganisms in the one or more soil samples to multiply into a native batch; and
    distributing at least a portion of the native batch to a distribution location;
    wherein the one or more sample locations include at least one of a location near where the one or more citrus trees will be treated for the citrus greening and a location at where the one or more citrus trees will be treated for the citrus greening; and wherein the distribution location includes an area within 100 meters of a furthest root extension of a root system of a citrus tree affected by the citrus greening.

2. The method of claim 1, wherein the one or more sample locations include a healthy location where the one or more citrus trees are not affected by the citrus greening.

3. The method of claim 1, wherein the one or more native microorganisms include one or more algae native to the one or more sample locations and/or the distribution location.

4. The method of claim 3, wherein the one or more native microorganisms include one or more of:

unicellular algal species that are typically green or blue-green;

flagellated strains of microalgae that are capable of movement once delivered to the distribution location; and algae with mixotrophic growth capability that utilize multiple food sources to grow.

5. The method of claim 1, wherein the native batch includes one or more of:

unicellular algal species that are typically green or blue-green;

flagellated strains of microalgae that are capable of movement once delivered to the distribution location; and algae with mixotrophic growth capability that utilize multiple food sources to grow.

6. The method of claim 1,
wherein a method step includes performing reactor performance validation; and
wherein the reactor performance validation includes testing microorganism candidates from the one or more native microorganisms for the distributing in identical bioreactors.

7. The method of claim 1,
wherein a method step includes performing contamination resilience; and
wherein the contamination resilience includes exposing the one or more native microorganisms to a contamination test; and
wherein a method step includes choosing the one or more native microorganisms most resistant to standard contamination.

8. The method of claim 1,
wherein a method step incudes testing inhibitory or bactericidal effects on *Candidatus Liberibacter* spp.

9. The method of claim 1,
wherein the distributing includes adding the native batch to an irrigation system configured to deliver fluid to the distribution location.

10. The method of claim 1,
wherein the distributing at least a portion of the native batch to the distribution location includes supplying a concentration per unit volume of native algae to the distribution location at an average of 10 times or more than a current amount of the native algae at the distribution location.

11. A method for treating citrus greening comprising steps of:
selecting a geological area comprising one or more citrus trees;
taking one or more soil samples comprising one or more native microorganisms at one or more sample locations;
adding a nutrient mixture to the one or more soil samples that enables the one or more native microorganisms in the one or more soil samples to multiply into a native batch; and
distributing at least a portion of the native batch to a distribution location;
wherein the one or more sample locations include at least one of a location near where the one or more citrus trees will be treated for citrus greening and a location at where the one or more citrus trees will be treated for citrus greening;
wherein the one or more sample locations include a healthy location where the one or more citrus trees are not affected by the citrus greening;
wherein the distribution location includes an area within 100 meters of a furthest root extension of a root system of a citrus tree affected by the citrus greening; and
wherein the one or more native microorganisms include one or more algae native to the one or more sample locations and/or the distribution location.

12. The method of claim 11,
wherein the one or more native microorganisms and/or the native batch includes one or more of:
unicellular algal species that are typically green or blue-green;
flagellated strains of microalgae that are capable of movement once delivered to the distribution location; and
algae with mixotrophic growth capability that utilize multiple food sources to grow.

13. The method of claim 12,
wherein the distributing includes adding the native batch to an irrigation system configured to deliver water to the one or more citrus trees in the distribution location; and
wherein the distributing at least a portion of the native batch to the distribution location includes supplying a concentration per unit volume of native algae to the distribution location at an average of 10 times or more than a current amount of the native algae at the distribution location.

14. The method of claim 13,
wherein a method step includes performing one or more of:
a reactor performance validation that includes testing microorganism candidates from the one or more native microorganisms for the distributing in identical bioreactors;
a contamination resilience test that includes exposing the one or more native microorganisms to contamination and choosing at least one of the one or more native microorganisms most resistant to the contamination; and
an inhibitory or bactericidal effects test that includes exposing the one or more native microorganisms to *Candidatus Liberibacter* spp.

\* \* \* \* \*